(12) United States Patent
Sakaguchi et al.

(10) Patent No.: US 11,603,927 B2
(45) Date of Patent: Mar. 14, 2023

(54) SHIFT RANGE CONTROL APPARATUS

(71) Applicants: DENSO CORPORATION, Kariya (JP); HONDA MOTOR CO., LTD., Tokyo (JP)

(72) Inventors: Koji Sakaguchi, Kariya (JP); Masahiko Akiyama, Wako (JP); Masashi Misawa, Wako (JP); Kenshi Masuo, Wako (JP)

(73) Assignees: DENSO CORPORATION, Kariya (JP); HONDA MOTOR CO., LTD., Tokyo (JP)

( * ) Notice: Subject to any disclaimer, the term of this patent is extended or adjusted under 35 U.S.C. 154(b) by 384 days.

(21) Appl. No.: 17/012,575

(22) Filed: Sep. 4, 2020

(65) Prior Publication Data

US 2020/0400232 A1 Dec. 24, 2020

Related U.S. Application Data

(63) Continuation of application No. PCT/JP2019/008493, filed on Mar. 5, 2019.

(30) Foreign Application Priority Data

Mar. 7, 2018 (JP) .............................. JP2018-040650

(51) Int. Cl.
*H02P 23/18* (2016.01)
*F16H 61/32* (2006.01)
*F16H 61/24* (2006.01)
*F16H 61/28* (2006.01)
*F16H 61/02* (2006.01)
*H02P 23/16* (2016.01)
(Continued)

(52) U.S. Cl.
CPC .......... *F16H 61/32* (2013.01); *F16H 61/0204* (2013.01); *F16H 61/24* (2013.01); *F16H 61/2807* (2013.01); *H02P 6/16* (2013.01); *H02P 23/16* (2016.02); *H02P 25/026* (2013.01); *H02P 29/0016* (2013.01); *F16H 2061/247* (2013.01); *F16H 2061/326* (2013.01)

(58) Field of Classification Search
CPC .. H02P 23/18; H02P 23/16; H02P 6/16; H02P 25/026; H02P 29/0016; F16H 2061/326
See application file for complete search history.

(56) References Cited

U.S. PATENT DOCUMENTS

2005/0174084 A1    8/2005    Nakai et al.
2012/0119689 A1*   5/2012    Yamada .................. H02P 23/18
                                                                   318/630

* cited by examiner

*Primary Examiner* — Cortez M Cook
(74) *Attorney, Agent, or Firm* — Nixon & Vanderhye P.C.

(57) ABSTRACT

A shift range control apparatus controls a shift range switching system that switches shift ranges by controlling driving of a motor. This control apparatus calculates a motor angle based on a motor rotation angle signal, acquires an output shaft signal based on a rotation position of an output shaft from an output shaft sensor, sets a target rotation angle based on a target shift range and the output shaft signal, and controls driving of the motor such that the motor angle becomes the target rotation angle. The control apparatus sets the target rotation angle to a target limit value, in response to the target rotation angle that is set based on the output shaft signal being a value at which rotation occurs that is further toward a back side in a rotation direction than the target limit value that is set based on shift ranges before and after switching.

7 Claims, 11 Drawing Sheets

(51) Int. Cl.
*H02P 29/00* (2016.01)
*H02P 25/026* (2016.01)
*H02P 6/16* (2016.01)

SHIFT RANGE CONTROL APPARATUS

CROSS-REFERENCE TO RELATED APPLICATIONS

The present application is a continuation application of International Application No. PCT/JP2019/008493, filed Mar. 5, 2019, which claims priority to Japanese Patent Application No. 2018-040650, filed Mar. 7, 2018. The contents of these applications are incorporated herein by reference in their entirety.

BACKGROUND

Technical Field

The present disclosure relates to a shift range control apparatus.

Related Art

A known range switching mechanism switches shift ranges by driving a motor. In this mechanism, a target motor rotation angle of the motor is set using an angle of an output shaft sensor that detects a rotation position of an output shaft to which a rotation of the motor is transmitted.

SUMMARY

An aspect of the present disclosure provides a shift range control apparatus for controlling a shift range switching system that switches shift ranges by controlling driving of a motor. This control apparatus acquires a motor rotation angle signal based on a rotation position of the motor from a motor rotation angle sensor that detects a rotation of the motor, and calculates a motor angle based on the motor rotation angle signal. The control apparatus acquires an output shaft signal based on a rotation position of an output shaft from an output shaft sensor that detects the rotation position of the output shaft to which the rotation of the motor is transmitted. The control apparatus sets a target rotation angle based on a target shift range and the output shaft signal, and controls driving of the motor such that the motor angle becomes the target rotation angle. The control apparatus sets the target rotation angle to a target limit value, in response to the target rotation angle that is set based on the output shaft signal being a value at which rotation occurs that is further toward a back side in a rotation direction than the target limit value that is set based on shift ranges before and after switching.

BRIEF DESCRIPTION OF THE DRAWINGS

In the accompanying drawings.

DESCRIPTION OF THE EMBODIMENTS

Conventionally, a range switching mechanism that switches shift ranges by driving a motor is known. For example, in Japanese Patent No. 4385768, a target motor rotation angle is set through use of an angle of an output shaft sensor.

When the output shaft sensor is used to set the target angle of the motor as in Japanese Patent No. 4385768, if noise is generated in a sensor signal of the output shaft sensor or an abnormality occurs in the sensor, the target angle of the motor may be set to an erroneous position. It is thus desired to provide a shift range control apparatus that is capable of appropriately switching shift ranges.

An exemplary embodiment provides a shift range control apparatus for controlling a shift range switching system that switches shift ranges by controlling driving of a motor. The shift range control apparatus includes a motor angle calculating unit, an output shaft signal acquiring unit, a target angle setting unit, and a driving control unit.

The motor angle calculating unit acquires a motor rotation angle signal that is based on a rotation position of the motor from a motor rotation angle sensor that detects a rotation of the motor, and calculates a motor angle based on the motor rotation angle signal. The output shaft signal acquiring unit acquires an output shaft signal that is based on a rotation position of an output shaft from an output shaft sensor that detects the rotation position of the output shaft to which the rotation of the motor is transmitted. The target angle setting unit sets a target rotation angle based on a target shift range and the output shaft signal. The driving control unit controls driving of the motor such that the motor angle becomes the target rotation angle.

The target angle setting unit sets the target rotation angle to a target limit value, in response to the target rotation angle that is set based on the output shaft signal being a value at which rotation occurs that is further toward a back side in a rotation direction than the target limit value that is set based on shift ranges before and after switching.

As a result, for example, even if an erroneous target rotation angle is set as a result of an abnormality in the output shaft signal, the shift ranges can be appropriately switched by the target rotation angle being changed to the target limit value.

First Embodiment

Figure 1:
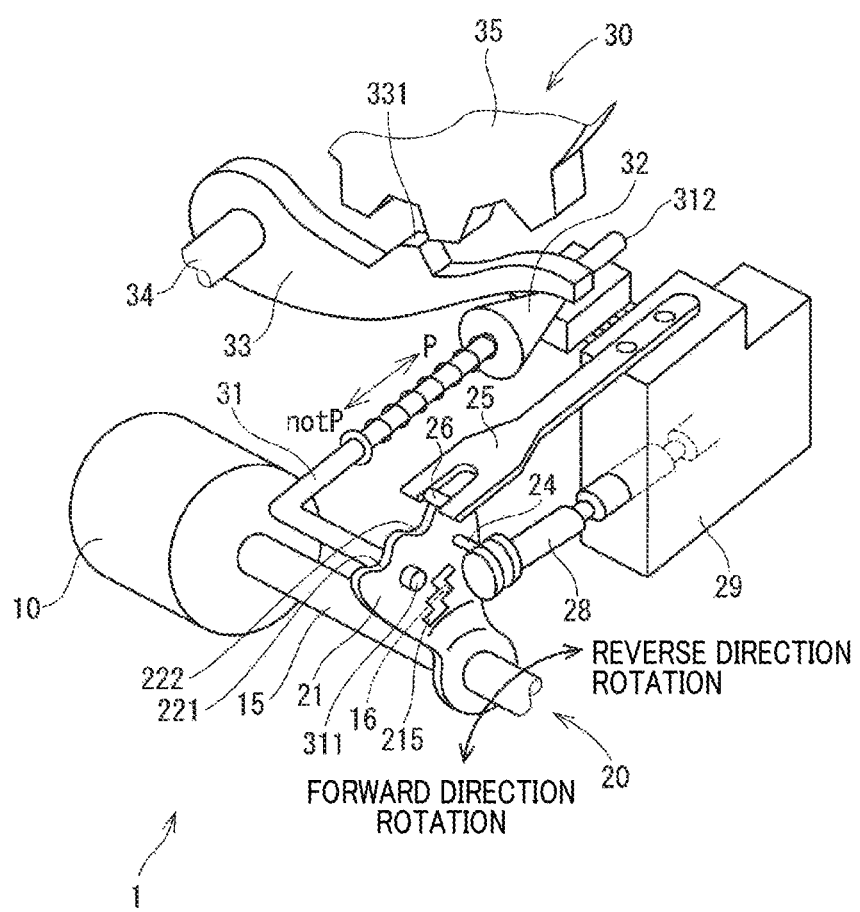
FIG. 1 is a perspective view illustrating a shift-by-wire system according to a first embodiment.
Figure 2:
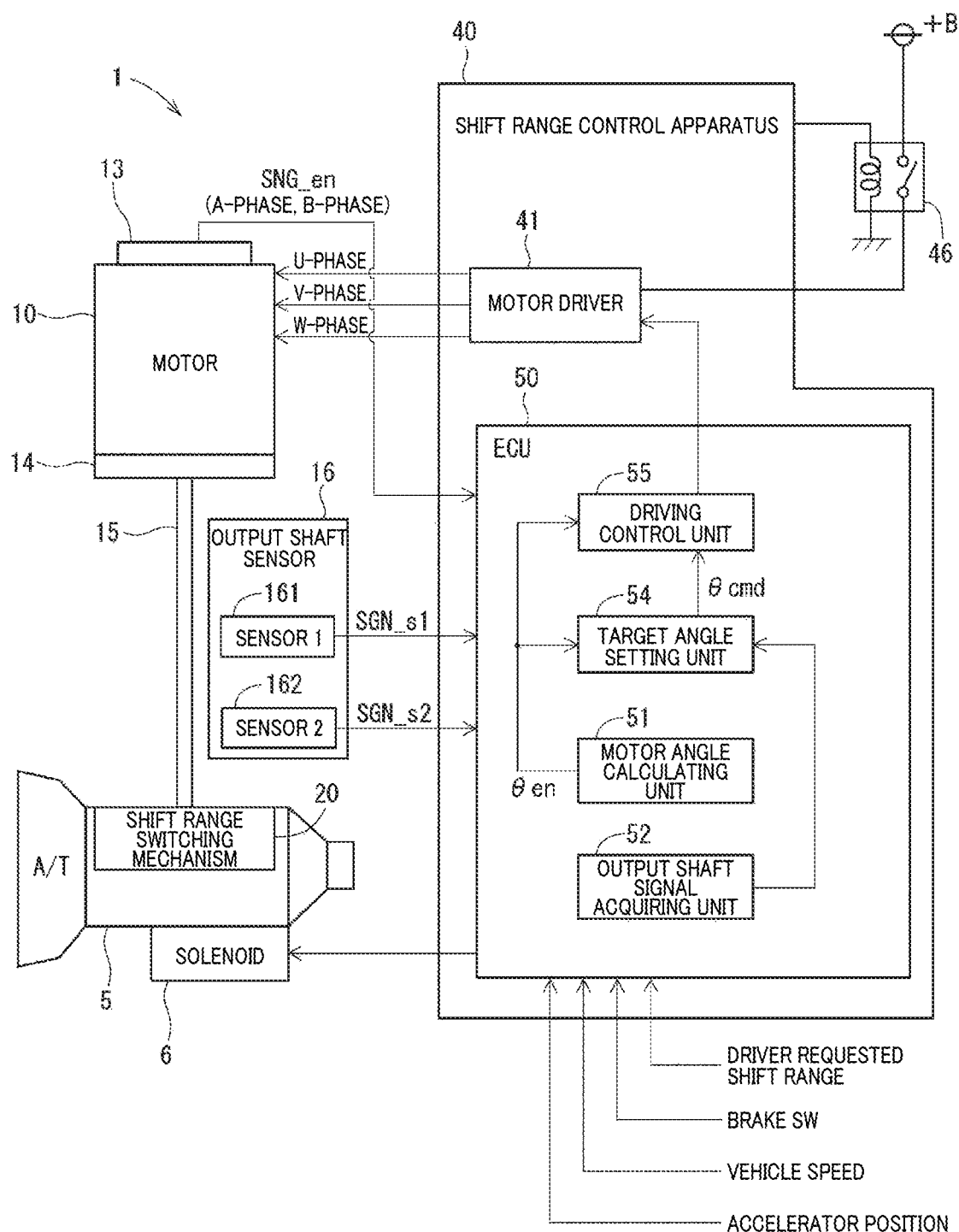
FIG. 2 is an overall configuration diagram illustrating the shift-by-wire system according to the first embodiment.

A shift range control apparatus will be described with reference to the drawings. Configurations according to a plurality of embodiments that are essentially identical are given the same reference numbers below. Descriptions thereof are omitted. A shift range control apparatus according to a first embodiment is shown in FIG. 1 to FIG. 10. As shown in FIG. 1 and FIG. 2, a shift-by-wire system 1 that serves as a shift range switching system includes a motor 10, a shift range switching mechanism 20, a parking lock mechanism 30, a shift range control apparatus 40, and the like.

The motor 10 rotates by electric power supplied from a battery that is mounted in a vehicle (not shown) and functions as a driving source of the shift range switching mechanism 20. The motor 10 according to the present embodiment is a switched reluctance motor. However, any type of motor, such as a direct-current (DC) motor, can be used.

As shown in FIG. 2, an encoder 13 that is a motor rotation angle sensor detects a rotation position of a rotor (not shown) of the motor 10. For example, the encoder 13 is a magnetic-type rotary encoder, and is configured by a magnet that integrally rotates with the rotor and a Hall integrated circuit (IC) for magnetic detection or the like. The encoder 13 synchronizes with the rotation of the rotor and outputs A-phase and B-phase pulse signals as each predetermined angle. Hereafter, a signal from the encoder 13 is referred to as a motor rotation angle signal SGN_en. A speed reducer 14 is provided between a motor shaft 105 (see FIG. 4 and the like) of the motor 10 and an output shaft 15. The speed reducer 14 decelerates the rotation of the motor 10 and outputs the rotation to the output shaft 15. As a result, the rotation of the motor 10 is transmitted to the shift range switching mechanism 20.

The output shaft sensor 16 has a first sensor unit 161 and a second sensor unit 162. The output shaft sensor 16 detects the rotation position of the output shaft 15. The output shaft sensor 16 according to the present embodiment is a magnetic sensor that detects changes in a magnetic field of a target 215 (see FIG. 1) that is provided in a detent plate 21 that serves as a rotating member, described hereafter. The output shaft sensor 16 is attached to a section in which detection of the magnetic field of the target 215 is possible. In the drawings, the first sensor unit 161 is referred to as a "sensor 1" and the second sensor unit 162 is referred to as a "sensor 2".

The sensor units 161 and 162 are so-called magnetoresistive (MR) sensors that have a magnetoresistive effect element (MR element) that detects changes in the magnetic field of the target 215. The first sensor unit 161 detects a magnetic field based on the rotation position of the target 215 and outputs an output shaft signal Sg1 to an electronic control unit (ECU) 50, described hereafter. The second sensor unit 162 detects a magnetic field based on the rotation position of the target 215 and outputs an output shaft signal Sg2 to the ECU 50. The output shaft sensor 16 according to the present embodiment has the two sensor units 161 and 162 that independently transmit output shaft signals SGN_s1 and SGN_s2 to the ECU 50. That is, the output shaft sensor 16 has a dual system. Hereafter, the output shaft signals SGN_s1 and SGN_s2 are collectively simply referred to as an output shaft signal SGN_s.

As shown in FIG. 1, the shift range switching mechanism 20 includes the detent plate 21, a detent spring 25 that serves as an urging member, and the like. The shift range switching mechanism 20 transmits rotation driving force that is outputted from the speed reducer 14 to a manual valve 28 and a parking lock mechanism 30. The detent plate 21 is fixed to the output shaft 15 and driven by the motor 10. According to the present embodiment, a direction in which the detent plate 21 moves away from a base portion of the detent spring 25 is a forward (normal) rotation direction. A direction in which the detent plate 21 moves toward the base portion is a reverse rotation direction.

The detent plate 21 is provided with a pin 24 that protrudes in parallel with the output shaft 15. The pin 24 is connected to the manual valve 28. As a result of the detent plate 21 being driven by the motor 10, the manual valve 28 reciprocally moves in an axial direction. That is, the shift range switching mechanism 20 converts rotation movement of the motor 10 to linear movement and transmits the linear movement to the manual valve 28. The manual valve 28 is provided in a valve body 29. As a result of the manual valve 28 reciprocally moving in the axial direction, hydraulic supply paths to a hydraulic clutch (not shown) are switched. As a result of engagement states of the hydraulic clutch being switched, the shift range is changed.

Figure 5:
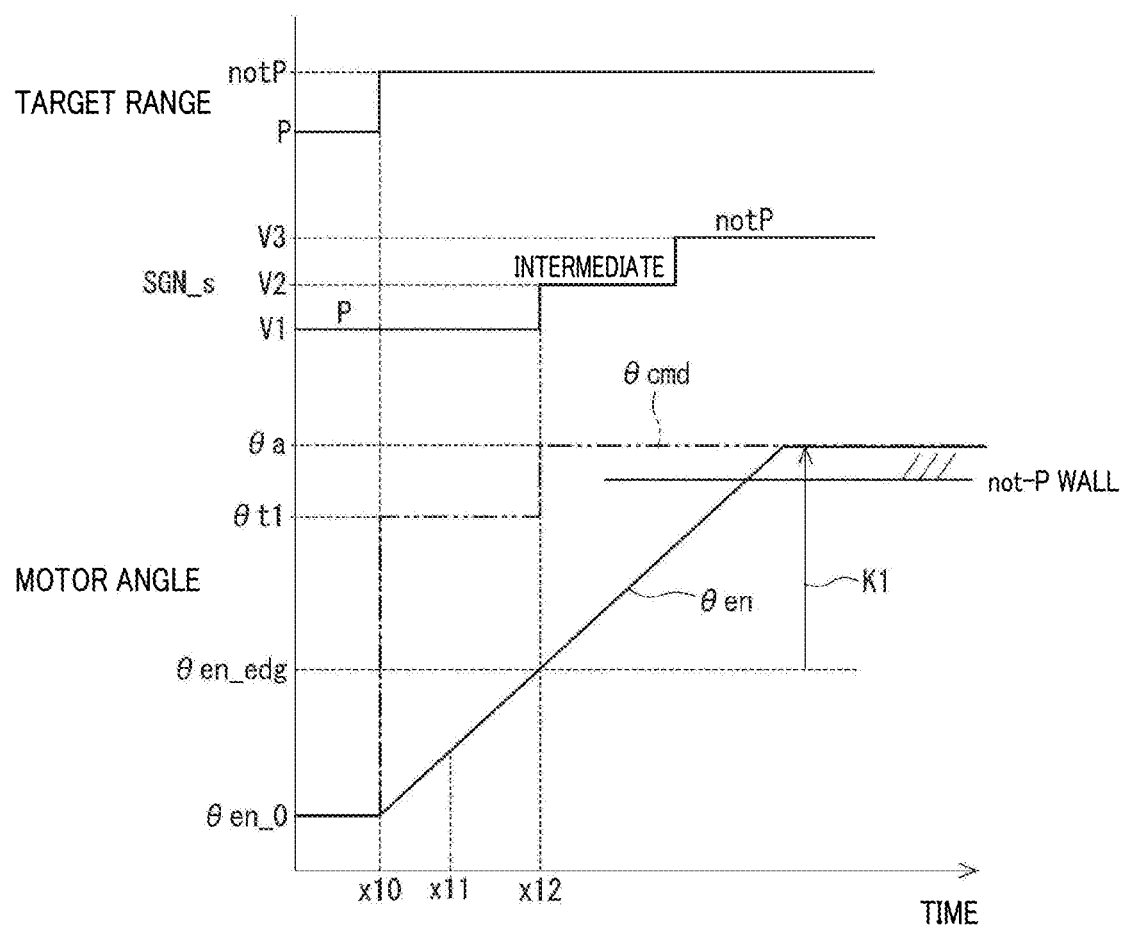
FIG. 5 is a timing chart for explaining erroneous setting of the target count value during an abnormality in an output shaft signal.

A first valley portion 221, a second valley portion 222, and a peak portion 225 that is formed between the two valley portions 221 and 222 are provided on the detent spring 25 side of the detent plate 21 (see FIG. 5). According to the present embodiment, a side closer to the base portion of the detent spring 25 is the second valley portion 222 and a side farther from the base portion of the detent spring 25 is the first valley portion 221. According to the present embodiment, the valley portion 221 corresponds to a P (parking) range and the valley portion 222 corresponds to a not-P (non-P) range that is other than the P range. In addition, the detent plate 21 is also provided with wall portions 226 and 227 that restrict movement of a detent roller 26 in directions toward the outer sides of the valley portions 221 and 222. Hereafter, the wall portion on the P range side is a first wall portion 226 and a wall portion on the not-P range side is a second wall portion 227.

The target 215 is provided in the detent plate 21 such that the magnetic field changes based on the rotation of the output shaft 15. The target 215 is formed by a magnetic body. The target 215 may be a member that is separate from the detent plate 21. Alternatively, if the detent plate 21 is a magnetic body, for example, the target 215 may be formed by press working or the like being performed on the detent plate 21. The target 215 is formed such that an output voltage that is the output shaft signal SGN_s of the output shaft sensor 16 changes in a stepped manner based on the rotation position of the output shaft 15.

Figure 4:
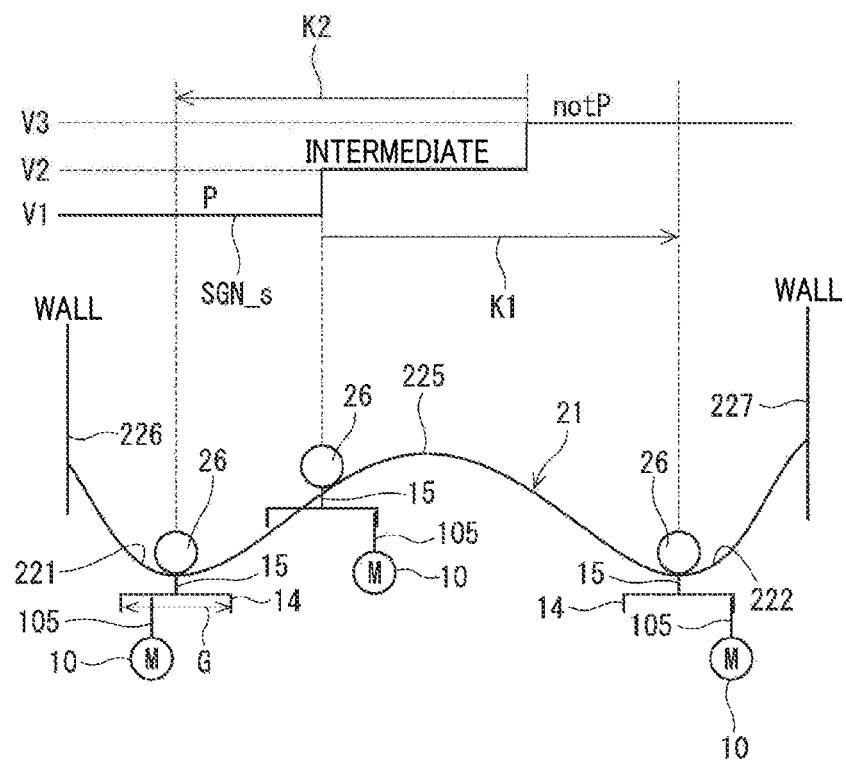
FIG. 4 is a schematic diagram for explaining the setting of the target count value according to the first embodiment.

As shown in FIG. 4 and the like, the output shaft signal SGN_s is a value among three stages that are a value V1 that corresponds to the P range, a value V3 that corresponds to the not-P range, and an intermediate value V2. The not-P range refers to a range other than the P range. The value V1, the value V2, and the value V3 that the output shaft signal SGN_s may be are dispersed. The output shaft signal SGN_s is not an intermediate value of the values. In addition, differences between the value V1 and the value V2 and between the value V2 and the value V3 are set to be sufficiently large values compared to a sensor error and the like. That is, according to the present embodiment, the value of the output shaft signal SGN_s changes in a stepped manner. In addition, according to the present embodiment, the output shaft signal switches to values that differ to an extent that the values cannot be considered continuous, in accompaniment with the rotation of the output shaft. This is considered to be "the value changes in a stepped manner". Here, the difference between the value V1 and the value V2, and the difference between the value V2 and the value V3 may be equal or may differ. Hereafter, switching of the values is referred to as an "edge", as appropriate.

As shown in FIG. 1, the detent spring 25 is a plate-shaped member that is capable of elastic deformation. The detent roller 26 that serves as an engaging member is provided at a tip end of the detent spring 25. The detent spring 25 urges the detent roller 26 toward a rotational center side of the detent plate 21. When a predetermined rotational force or greater is applied to the detent plate 21, the detent spring 25 elastically deforms, and the detent roller 26 moves between the valley portions 221 and 222. As a result of the detent roller 26 fitting into either of the valley portions 221 and 222, swinging of the detent plate 21 is regulated. An axial-direction position of the manual valve 28 and a state of the parking lock mechanism 30 are determined, and a shift range of an automatic transmission 5 is fixed. When the shift range is the not-P range, the detent roller 26 fits into the valley portion 222. When the shift range is the P range, the detent roller 26 fits into the valley portion 221. According to the present embodiment, a portion into which the detent roller 26 fits as a result of the urging force of the detent spring 25 is a bottommost portion of the valley portion 221 or 222, based on the shift range.

The parking lock mechanism 30 includes a parking rod 31, a conical body 32, a parking lock pole 33, a shaft portion 34, and a parking gear 35. The parking rod 31 is formed into an approximately L-like shape. A first end 311 side of the parking rod 31 is fixed to the detent plate 21. The conical body 32 is provided on a second end 312 side of the parking rod 31. The conical body 32 is formed so as to decrease in diameter toward the the second end 312 side. When the detent plate 21 swings in a reverse rotation direction, the conical body 32 moves in a P direction.

The parking lock pole 33 is provided so as to comes into contact with a conical surface of the conical body 32 and be capable of swinging around the shaft portion 34. A protruding portion 331 that is capable of meshing with the parking gear 35 is provided on the parking gear 35 side of the parking lock pole 33. When the detent plate 21 rotates in the reverse rotation direction and the conical member 32 moves in the P direction, the parking lock pole 33 is pressed upward, and the protruding portion 331 and the parking gear 35 mesh. Meanwhile, when the detent plate 21 rotates in the forward rotation direction and the conical body 32 moves in a not-P direction, the meshing between the protruding portion 331 and the parking gear 35 is released.

The parking gear 35 is provided on an axle (not shown) and is provided to be capable of meshing with the protruding portion 331 of the parking lock pole 33. When the parking gear 35 and the protruding portion 331 mesh, rotation of the axle is regulated. When the shift range is the not-P range, the parking gear 35 is not locked by the parking lock pole 33 and the rotation of the axle is not obstructed by the parking lock mechanism 30. In addition, when the shift range is the P range, the parking gear 35 is locked by the parking lock pole 33 and rotation of the axle is regulated.

As shown in FIG. 2, the shift range control apparatus 40 includes a motor driver 41, the ECU 50, and the like. The motor driver 41 outputs a drive signal that is related to energization of each phase (U-phase, V-phase, and W-phase) of the motor 10. A motor relay 46 is provided between the motor driver 41 and the battery. The motor relay 46 is turned on when a start switch of the vehicle that is an ignition switch or the like is turned on, and electric power is supplied to the motor 10 side. In addition, the motor relay 46 is turned off when the start switch is turned off, and the supply of electric power to the motor 10 side is interrupted. Furthermore, as a result of on-off of the motor relay 46 being controlled, switching between supply and interruption of electric power to the motor 10 is performed.

The ECU 50 is mainly configured by a microcomputer or the like. The ECU 50 includes therein a central processing unit (CPU), a read-only memory (ROM), a random access memory (RAM), an input/output (I/O), a bus line that connects these configurations, and the like (none of which are shown). Each process of the ECU 50 may be a software process that is actualized by the CPU running a program that is stored in advance in a physical memory apparatus (that is, a readable, non-temporary, tangible recording medium) such as the ROM. Alternatively, each process may be a hardware process that is actualized by a dedicated electronic circuit.

The ECU 50 controls switching of the shift range by controlling driving of the motor 10 based on a driver-requested shift range, a signal from a brake switch, a vehicle speed, and the like. In addition, the ECU 50 controls driving of a transmission hydraulic control solenoid 6 based on the vehicle speed, an accelerator position, the driver-requested shift range, and the like. As a result of the transmission hydraulic control solenoid 6 being controlled, gear position is controlled. A number of transmission hydraulic control solenoids 6 that corresponds to a number of gear positions or the like is provided. According to the present embodiment, a single ECU 50 controls driving of the motor 10 and the solenoids 6. However, the ECU may be separated into a motor ECU for motor control that controls the motor 10 and an AT-ECU for solenoid control. Hereafter, driving control of the motor 10 will mainly be described.

The ECU 50 includes a motor angle calculating unit 51, an output shaft signal acquiring unit 52, a target angle setting unit 54, a driving control unit 55, and the like. The motor angle calculating unit 51 counts pulse edges of the A-phase signals and the B-phase signals based on the motor rotation angle signal SGN_en acquired from the encoder 13 and calculates an encoder count value θen. The encoder count value θen is a value based on the rotation position of the motor 10 and corresponds to a "motor angle". The output shaft signal acquiring unit 52 acquires the output shaft signal SGN_s from the output shaft sensor 16.

The target angle setting unit 54 sets a target count value θcmd at which the motor 10 is stopped, based on a target shift range and the output shaft signal. SGN_s. According to the present embodiment, the target count value θcmd corresponds to a "target rotation angle". The driving control unit 55 controls driving of the motor 10 by feedback control or the like such that the encoder count value θen becomes the target count value θcmd. Details of driving control of the motor 10 may be of any kind.

Figure 3:
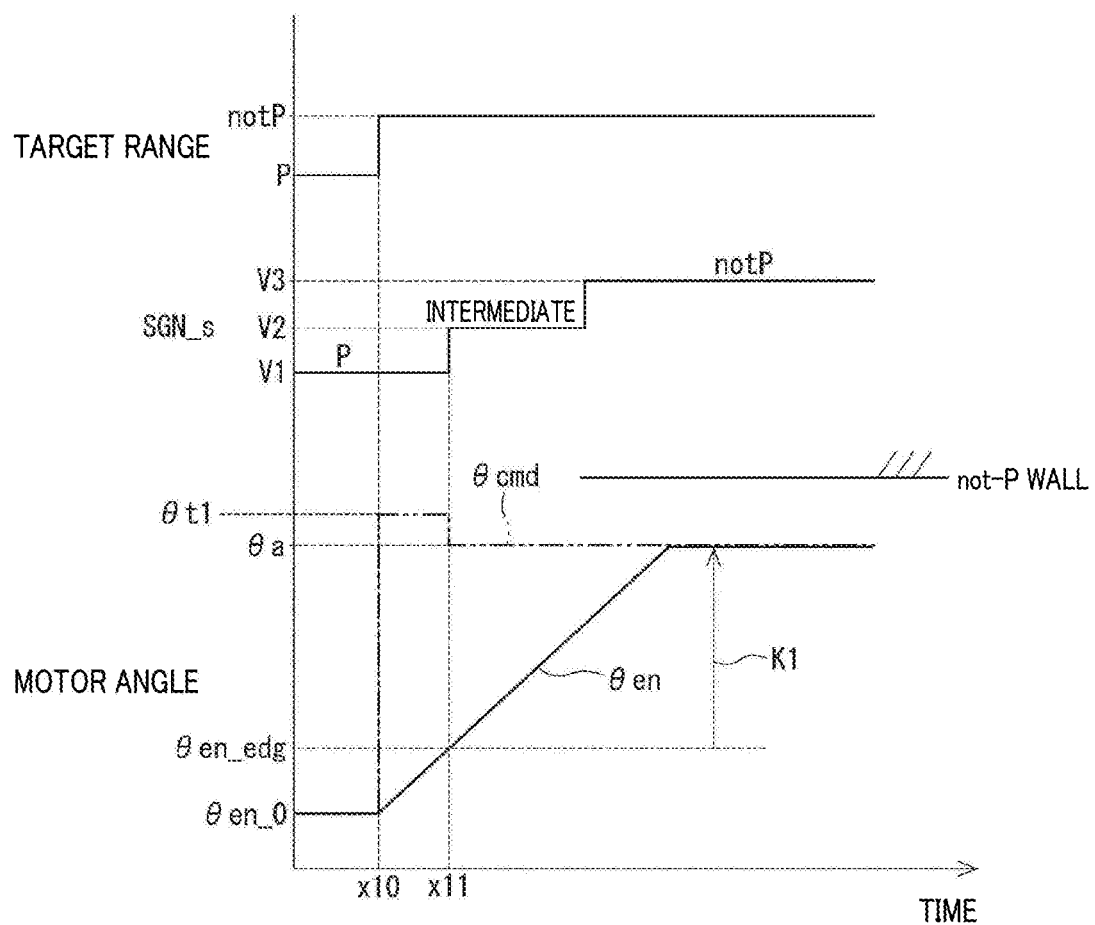
FIG. 3 is a timing chart for explaining setting of a target count value according to the first embodiment.

Setting of the target count value θcmd will be described with reference to FIG. 3 and FIG. 4. FIG. 3 has a common time axis as a horizontal axis and, from a top portion, shows the target range, the output shaft signal SGN_s, and the motor angle. The motor angle is the encoder count value θen. Hereafter, the encoder count value θen at a start of range switching is θen_0. In addition, the second wall portion 227 is referred to as a "not-P wall". This similarly applies to FIG. 5 and the like, described hereafter.

FIG. 4 schematically shows a relationship among the motor shaft 105 that is the rotation shaft of the motor 10, the output shaft 15, and the detent plate 21. As shown in FIG. 4, play exists between the motor shaft 105 and the output shaft 15. In FIG. 4, the speed reducer 14 and the output shaft 15 are integrated, and "play" is formed between the motor shaft 105 and the speed reducer 14. However, the motor shaft 105 and the speed reducer 14 may be integrated and "play" may be formed between the speed reducer 14 and the output shaft 15. "Play" can be considered to be a total amount of play and backlash present between the motor shaft 105 and the output shaft 15. Hereafter, an angle corresponding to the total amount of play provided between the motor shaft 105 and the output shaft 15 is a backlash angle θg. In addition, the total amount of play is simply referred to as "backlash". The term "play" as used in the present specification refers to a clearance such as a gap between machine components that allows the components to move freely.

FIG. 4 shows a state in which the detent roller 26 moves between the valley portions 221 and 222 in accompaniment with the rotation of the output shaft 15, with the rotation direction of the motor 10 being a left/right direction on paper. In actuality, the detent roller 26 moves between the valley portions 221 and 222 as a result of the detent plate 21 rotating. However, in FIG. 4, for the purpose of description, the detent roller 26 is shown to move together with the output shaft 15. This similarly applies to FIG. 6 and the like, described hereafter.

Hereafter, a case in which the shift range is switched from the P range to the not-P range is described as an example. When the target shift range is switched from the P range to the not-P range at time x10, a provisional target value θt1 is set as the target count value θcmd and driving of the motor 10 is started. According to the present embodiment, a value that is provisionally set when the shift range is switched from the P range to the not-P range is the provisional target value θt1. A value that is provisionally set when the shift range is switched from the not-P range to the P range is a provisional target value θt2. The provisional target values θt1 and θt2 are set to arbitrary values that are such that the detent roller 26 is able to pass over the peak portion 25.

When the output shaft signal SGN_s is switched from the value V1 to the value V2 at time x11, the target count value θcmd is changed to a target correction value θa. The target correction value θa is calculated from the encoder count value θen when the output shaft signal SGN_s is switched and design values K1 and K2. Expression (1-1) is a value when the shift range is switched from the P range to the not-P range. Expression (1-2) is a value when the shift range is switched from the not-P range to the P range.

$$\theta a = \theta en\_edg + K1 \quad (1\text{-}1)$$

$$\theta a = \theta en\_edg + K2 \quad (1\text{-}2)$$

In expressions (1-1) and (1-2), θen_edg is the encoder count value at an edge detection timing. The design value K1 is a value that is based on an angle from a position at which the output shaft signal SGN_s is switched from the value V1 to the value V2 to the bottommost portion of the valley portion 222. The design value K2 is a value that is based on an angle from a position at which the output shaft signal SGN_s is switched from the value V3 to the value V2 to the bottommost portion of the valley portion 221. The design values K1 and K2 are both values that are converted to the encoder count value θen and set to positive or negative based on the rotation direction. According to the present embodiment, K1 is a positive value and K2 is a negative value.

When the output shaft signal SGN_s is normal, the detent roller 26 can be stopped in the bottommost portion of the valley portion 222 as a result of the target count value θcmd being corrected during edge detection. Here, the target count value θcmd is corrected at the timing at which the output shaft signal SGN_s is switched from the value V1 to the value V2. However, for example, the target count value θcmd may be corrected at the timing at which the output shaft signal SGN_s is switched from the value V2 to the value V3. Alternatively, the target count value θcmd may be corrected a plurality of times based on the output shaft signal SGN_s.

A case in which the output shaft signal SGN_s is abnormal will be described with reference to FIG. 5 and FIG. 6. The abnormality in the output shaft signal SGN_s may include an abnormality that occurs as a result of electrical noise and the like, an abnormality in assembly of the output shaft sensor 16, and the like.

Figure 6:
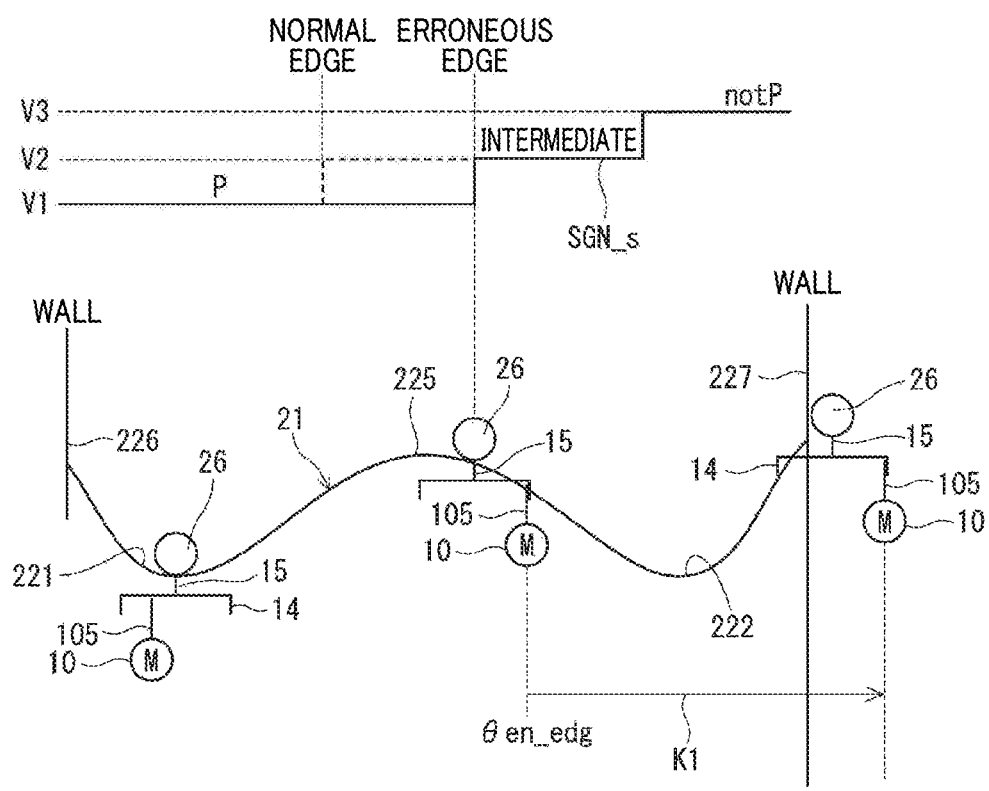
FIG. 6 is a schematic diagram for explaining erroneous setting of the target count value during an abnormality in the output shaft signal.

As shown in FIG. 5 and FIG. 6, when an abnormality in which the timing at which the output shaft signal SGN_s is switched from the value V1 to the value V2 is delayed occurs, when the correction in expression (1-1) is performed at time x12 that is the edge detection timing of the output shaft signal SGN_s, the target correction value θa may be set to be further toward a back side than the second wall portion 227. When the target count value θcmd is set to be further toward the back side than the wall portions 226 and 227, normal range switching may not be performed. In addition, when the detent roller 26 collides with the wall portion 226 or 227 at a high speed, the shift range switching mechanism 20 may become damaged. Furthermore, in a case in which an edge detection window for detecting the edge of the output shaft signal SGN_s is provided, when actual tolerance is accumulated, the window may become too wide and may not be established. In addition, even if the detection window is provided, the target correction value θa may be set to be further toward the back side than the wall portions 226 and 227 when the edge is detected in an edge portion of the window.

Figure 7:
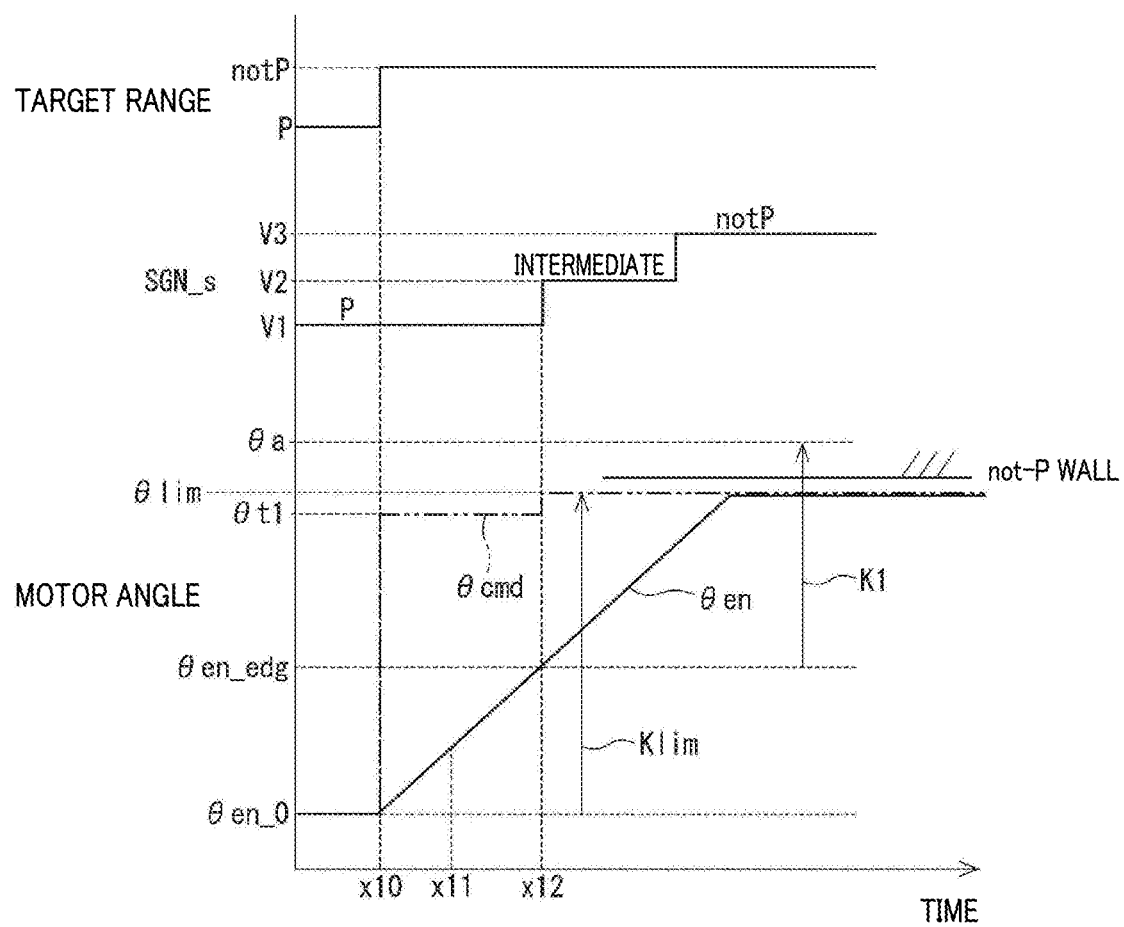
FIG. 7 is a timing chart for explaining the setting of the target count value according to the first embodiment.

Here, according to the present embodiment, as shown in FIG. 7, when the target correction value θa is set to be further toward the back side than the wall portions 226 and 227, a driving amount is restricted as a result of the target count value θcmd being changed to a target limit value θlim that is calculated in advance. The target limit value θlim is calculated using the encoder count value θen when the target shift range is switched and a driving limit amount Klim. Expression (2-1) is a value when the shift range is switched from the P range to the not-P range. Expression (2-2) is a value when the shift range is switched from the not-P range to the P range.

$$\theta\text{lim} = \theta en\_0 + K\text{lim} \quad (2\text{-}1)$$

$$\theta\text{lim} = \theta en\_0 - K\text{lim} \quad (2\text{-}2)$$

The driving limit amount Klim can be arbitrarily set. However, according to the present embodiment, the driving limit amount Klim is set by expression (3) using an inter-valley angle θv that is an angle between the bottommost portions of the valley portions 221 and 222, and the backlash angle θg. In terms of the angle of the output shaft 15, for example, the inter-valley angle θv is 20° and the backlash angle θg is 3.5°. However, the inter-valley angle θv and the backlash angle θg can be arbitrarily set. In addition, when used to set the target count value θcmd, the inter-valley angle θv and the backlash angle θg are both values that are converted to the encoder count value. The angle of the output shaft 15 and the encoder count value θen can be converted based on gear ratio.

$$K\text{lim} = \theta v + \theta g \quad (3)$$

Figure 8:
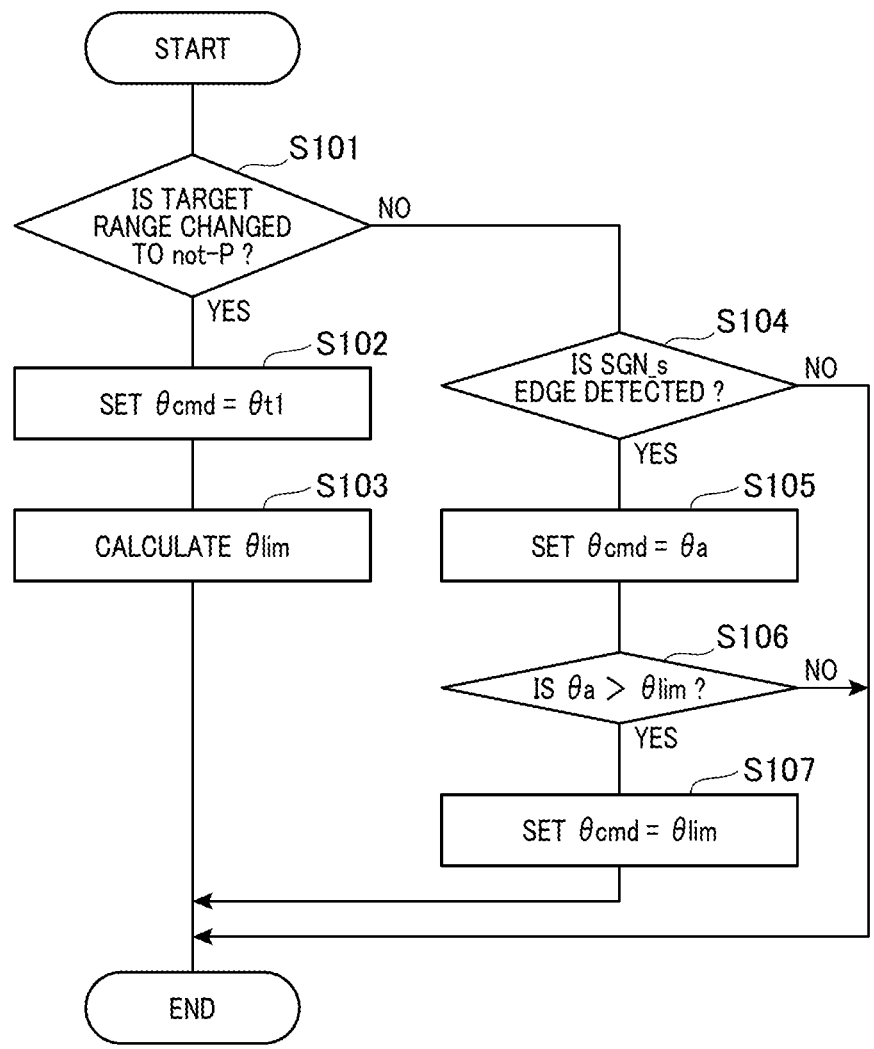
FIG. 8 is a flowchart for explaining a target angle setting process according to the first embodiment.
Figure 9:
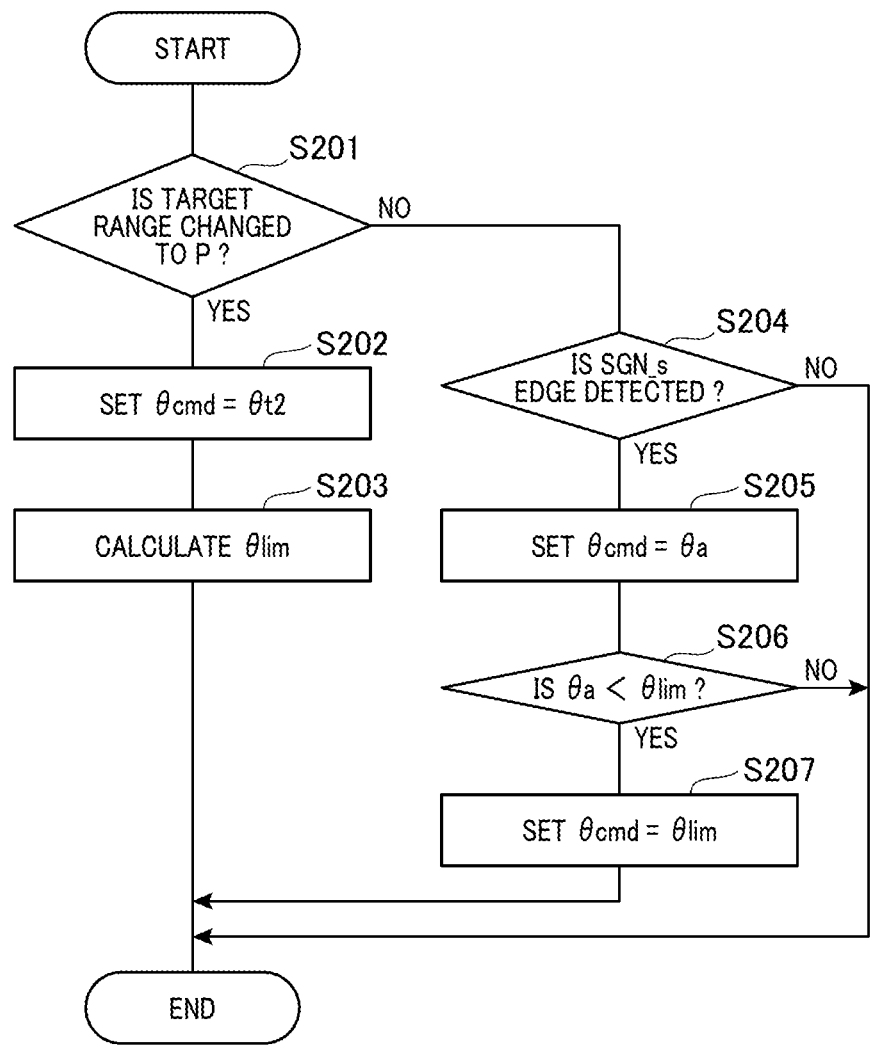
FIG. 9 is a flowchart for explaining the target angle setting process according to the first embodiment.

A target angle setting process according to the present embodiment will be described with reference to the flowcharts in FIG. 8 and FIG. 9. FIG. 8 is the case in which the shift range is switched from the P range to the not-P range. FIG. 9 is the case in which the shift range is switched from the not-P range to the P range. The process is performed by the target angle setting unit 54 at a predetermined cycle.

Hereafter, "step" in step S101 is omitted and simply denoted by a symbol "S". This also applies to other steps.

As shown in FIG. 8, at S101, the target angle setting unit 54 determines whether the target shift range is changed from the P range to the not-P range. Here, an affirmative determination is made only for an initial time that the range is switched. This similarly applies to S201. When determined that the target shift range is not changed to the not-P range (NO at S101), the target angle setting unit 54 proceeds to S104. When determined that the target shift range is changed to the not-P range (YES at S101), the target angle setting unit 54 proceeds to S102.

At S102, the target angle setting unit 54 sets the target count value θcmd to the provisional target value θt1. At S103, the target angle setting unit 54 adds the driving limit amount Klim to a current encoder count value θen and calculates the target limit value θlim (refer to expression (2-1)).

At S104, the target angle setting unit 54 determines whether the edge of the output shaft signal SGN_s is detected. Here, an affirmative determination is made when the output shaft signal SGN_s is switched from the value V1 to the value V2. When determined that the edge of the output shaft signal SGN_s is not detected (NO at S104), the target angle setting unit 54 ends the present routine without performing processes at S105 and subsequent thereto. When determined that the edge of the output shaft signal SGN_s is detected (YES at S104), the target angle setting unit 54 proceeds to S105.

At S105, the target angle setting unit 54 calculates the target correction value θa (refer to expression (1-1)) and changes the target count value θcmd from the provisional target value θa to the target correction value θa.

At S106, the target angle setting unit 54 determines whether the target correction value θa is greater than the target limit value θlim. When the target correction value θa is greater than the target limit value θlim, the target count value θcmd may be set to be further toward the back side than the wall portion 227. When determined that the target correction value θa is equal to or less than the target limit value θlim (NO at S106), the target angle setting unit 54 does not perform a process at S107. Therefore, the target count value θcmd remains set to the target correction value θa. When determined that the target correction value θa is greater than the target limit value θlim (YES at S106), the target angle setting unit proceeds to S107 and sets the target count value θcmd to the target limit value θlim.

As shown in FIG. 9, at S201, the target angle setting unit 54 determines whether the target shift range is changed from the not-P range to the P range. When determined that the target shift range is not changed to the P range (NO at S201), the target angle setting unit 54 proceeds to S204. When determined that the target shift range is changed to the P range (YES at S201), the target angle setting unit 54 proceeds to S202.

At S202, the target angle setting unit 54 sets the target count value θcmd to the provisional target value θt1. At S203, the target angle setting unit 54 subtracts the driving limit amount Klim from the current encoder count value θen and calculates the target limit value θlim (refer to expression (2-2)).

At S204, the target angle setting unit 54 determines whether the edge of the output shaft signal SGN_s is detected. Here, an affirmative determination is made when the output shaft signal SGN_s is switched from the value V3 to the value V2. When determined that the edge of the output shaft signal SGN_s is not detected (NO at S204), the target angle setting unit 54 ends the present routine without performing processes at S205 and subsequent thereto. When determined that the edge of the output shaft signal SGN_s is detected (YES at S204), the target angle setting unit 54 proceeds to S205.

At S205, the target angle setting unit 54 calculates the target correction value θa (refer to expression (1-2)) and changes the target count value θcmd from the provisional target value θa to the target correction value θa.

At S206, the target angle setting unit 54 determines whether the target correction value θa is less than the target limit value θlim. When the target correction value θa is less than the target limit value θlim, the target count value θcmd may be set to be further toward the back side than the wall portion 226. When determined that the target correction value θa is equal to or greater than the target limit value θlim (NO at S206), the target angle setting unit 54 does not perform a process at S207. Therefore, the target count value θcmd remains set to the target correction value θa. When determined that the target correction value θa is less than the target limit value θlim (YES at S206), the target angle setting unit proceeds to S207 and sets the target count value θcmd to the target limit value θlim. The driving control unit 55 controls driving of the motor 10 such that the encoder count value θen is the target value θcmd that is set.

Figure 10:
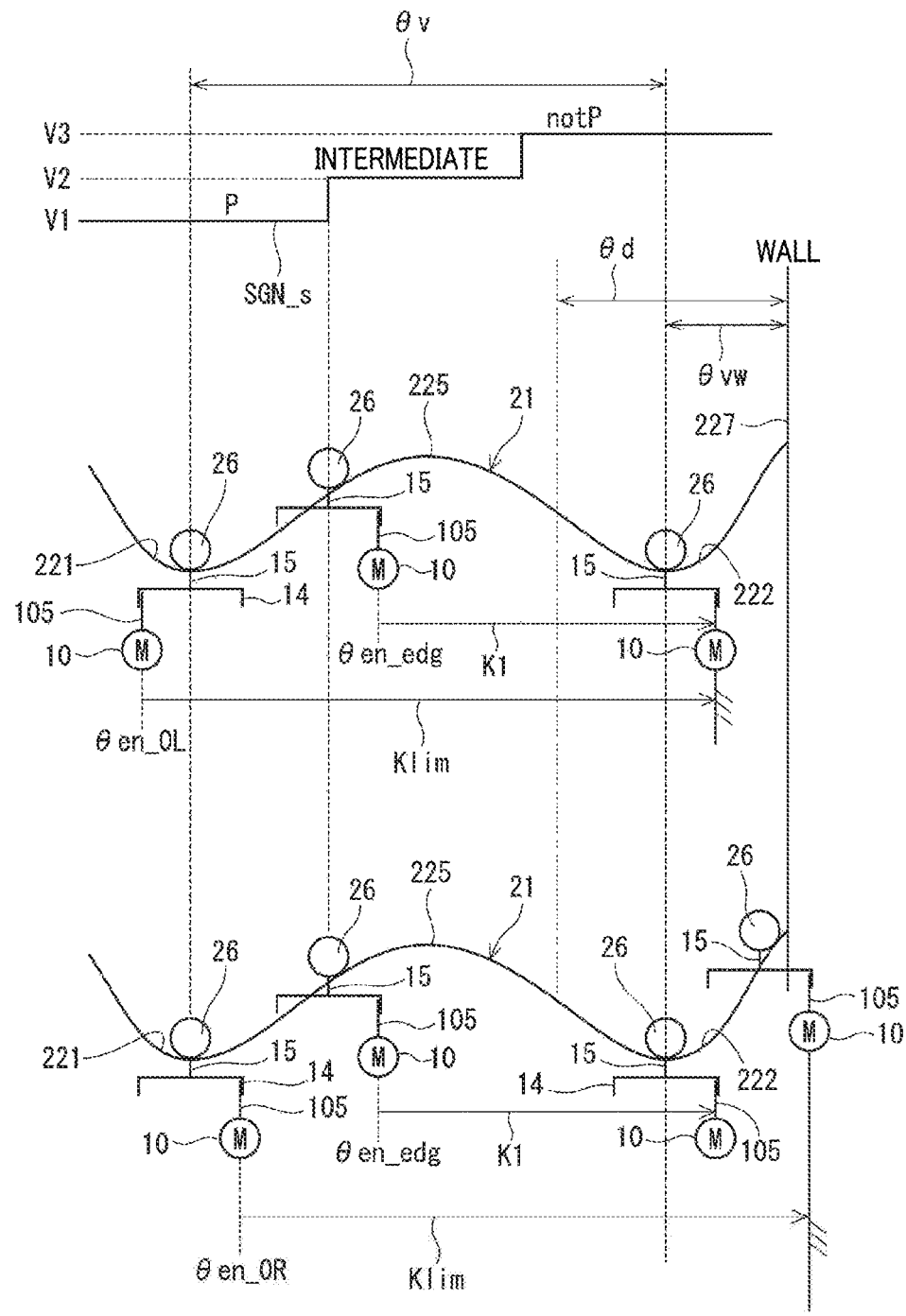
FIG. 10 is a schematic diagram for explaining a motor control process according to the first embodiment.

A motor control process according to the present embodiment will be described with reference to FIG. 10. In FIG. 10, the first wall portion 226 is omitted. A draw-in range θd that is a range in which the detent roller 26 can be dropped into the valley portion 22 by the urging force of the detent spring 25 is a range that is equal to or greater than ±θg from the bottommost portion of the valley portion 222. A valley-wall angle θvw that is an angle from the bottommost portion of the valley portion 222 to the second wall portion 227 is designed to be equal to or greater than the backlash angle θg.

A case in which the detent roller 26 is in the valley portion 221 and the motor shaft 105 is driven from a state of being furthest toward the P range side within the backlash is referred to as a "left-aligned start". A case in which the motor shaft 105 is driven from a state of being furthest toward the not-P range is referred to as a "right-aligned start". In FIG. 10, the output shaft signal SGN_s is shown in a top portion, the case of the left aligned start is shown in the middle portion, and the case of the right-aligned start is shown in a bottom portion. In FIG. 10, the encoder count value during the left aligned start is θen_0L and the encoder count value during the right-aligned start is θen_0R.

As shown in FIG. 10, when the output shaft signal SGN_s is normal, the target correction value θa that is based on the encoder count value θen_edg at the edge detection timing t which the output shaft signal SGN_s is switched from the value V1 to the value V2, and the design value K1 is the target count value θcmd. Therefore, regardless of the position within the backlash from which the motor shaft 105 is started, the motor 10 is stopped with the detent roller 26 in the bottommost portion of the valley portion 222. Therefore, vibration after the motor 10 has stopped can be suppressed.

In the case of the left-aligned start, the target limit value θlim is set to a position at which the detent roller 26 stops at the bottommost portion of the valley portion 222. In the case of right-aligned start, the target limit value θlim is set to a position at which the detent roller 26 rotates further toward the back side than the bottommost portion of the valley portion 222 by an amount amounting to the backlash angle θa. According to the present embodiment, the valley-wall angle θvw is designed to be equal to or greater than the backlash angle θg. Therefore, even if the motor 10 rotates to the target limit value θlim, the detent roller 26 stops before the wall portion 227. Therefore, regardless of where the motor shaft 105 is within the backlash at the start of driving, the detent roller 26 can be prevented from colliding with the second wall portion 227.

In addition, the draw-in range θd is designed to be equal to or greater than the backlash angle θg on both sides of the bottommost portion of the valley portion 222. Therefore, even if the motor 10 is rotated to the target limit value θlim at which the detent roller 26 becomes further toward the back side than the bottommost portion of the valley portion 222 at the right-aligned start, the detent roller 26 is dropped into the bottommost portion of the valley portion 222 by the urging force of the detent spring 25. As a result, even when the output shaft signal SGN_s is abnormal, the shift ranges can be appropriately switched.

As described above, the shift range control apparatus 40 according to the present embodiment controls the shift-by-wire system 1 that switches shift ranges by controlling driving of the motor 10. The shift range control apparatus 40 includes the motor angle calculating unit 51, the output shaft signal acquiring unit 52, the target angle setting unit 54, and the driving control unit 55.

The motor angle calculating unit 51 acquires the motor rotation angle signal SGN_en that is based on the rotation position of the motor 10 from the encoder 13 that detects the rotation of the motor 10, and calculates the encoder count value θen based on the motor rotation angle signal SGN_en. The output shaft signal acquiring unit 52 acquires the output shaft signal SGN_s that is based on the rotation position of the output shaft 15 from the output shaft sensor 16 that detects the rotation position of the output shaft 15 to which the rotation of the motor 10 is transmitted. The target angle setting unit 54 sets the target count value θcmd based on the output shaft signal SGN_s. The driving control unit 55 controls driving of the motor 10 such that the encoder count value θen becomes the target count value θcmd.

The target angle setting unit 54 sets the target count value θcmd to the target limit value θlim when the target count value θcmd that is set based on the target shift range and the output shaft signal SGN_s is a value at which rotation occurs that is further toward the back side in the rotation direction than the target limit value θlim set based on the shift ranges before and after switching. As a result, even if an erroneous target count value θcmd is set as a result of an abnormality in the output shaft signal SGN_s, the shift ranges can be appropriately switched by the target count value θcmd being changed to the target limit value θlim.

The shift-by-wire system 1 has the detent plate 21, the detent roller 26, and the detent spring 25. The plurality of valley portions 221 and 222 are formed in the detent plate. The detent plate 21 integrally rotates with the output shaft 15. The detent roller 26 engages with the valley portion 221 or 222 based on the shift range. The detent spring 25 urges the detent roller 26 in a direction in which the detent roller 26 fits together with the valley portion 221 or 222. Play exists between the motor shaft 105 that is the rotation shaft of the motor 10 and the output shaft 15. An angle that corresponds to a total amount of play is the backlash angle θg.

The target limit value is set based on the angle between the valley portion corresponding to the shift range before switching and the valley portion corresponding to the target shift range, and the backlash angle θg. As a result, the shift ranges can be appropriately switched without hindrance to a range switching function.

The valley portion includes the first valley portion 221 that is provided on one end side and corresponds to the P range and the second valley portion 222 that is provided on the other end side and corresponds to a range other than the P range. The first wall portion 226 that is provided on one end side of the first valley portion 221 and the second wall portion 227 that is provided on the other end side of the second valley portion 222 are formed in the detent plate 21. The angle between the first valley portion 221 and the first wall portion 226 and the angle between the second valley portion 222 and the second wall portion 227 are greater than the backlash angle θg.

The target limit value θlim is set to a position at which the detent roller 26 is further toward a front side than the first wall portion 226 or the second wall portion 27 and within the draw-in range in which the detent roller 26 can be fitted (drawn) into the valley portion 221 or 222 based on the target shift range by the urging force of the detent spring 25. As a result, the shift ranges can be appropriately switched without the detent roller 26 colliding with the wall portion 226 to 227.

Second Embodiment

Figure 11:
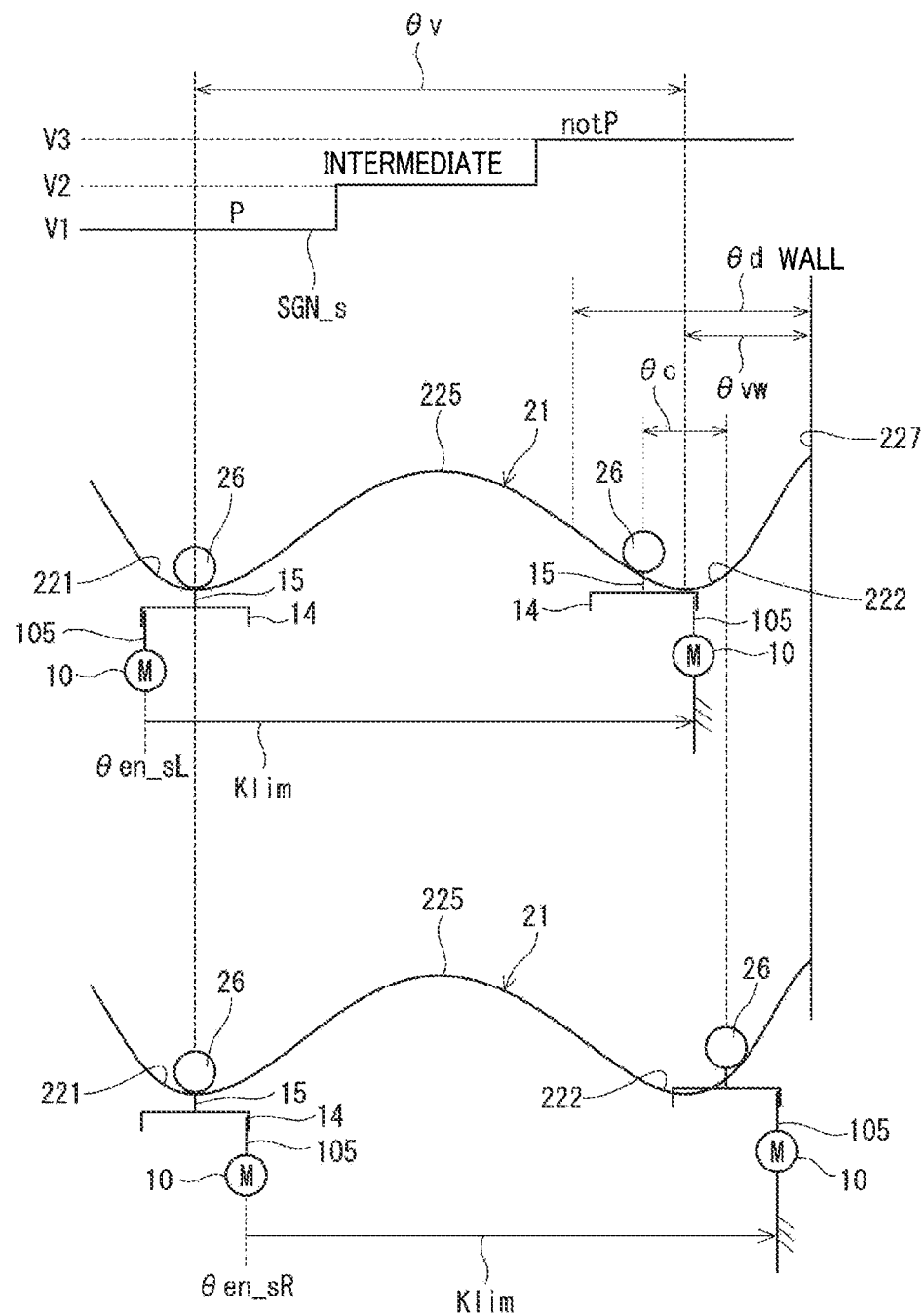
FIG. 11 is a schematic diagram for explaining a motor control process according to a second embodiment.

A second embodiment is shown in FIG. 11. FIG. 11 is a drawing that corresponds to FIG. 10. The setting of the target count value θcmd when the output shaft signal SGN_s is normal is similar to that according to the above-described embodiment and is, therefore, omitted. According to the present embodiment, the target limit value θlim differs from that according to the above-described embodiment. FIG. 11 describes switching from the P range to the not-P range. The backlash angle is 3.5° in terms of the angle of the output shaft 15, in a manner similar to that according to the above-described embodiment.

According to the present embodiment, when the shift range is switched from the P range to the not-P range, driving of the motor 10 is controlled such that the detent roller 26 is within a control range θc of which the bottommost portion of the valley portion 222 is the center. For example, when the control range θc is ±1.5° from the bottommost portion of the valley portion 222 in terms of the angle of the output shaft 15, the control range θc is ±3° and less than the backlash angle θg. Regarding the control range θc as well, when used to set the target count value θcmd, a value that is converted to the encoder count value θen is used. According to the present embodiment, the driving limit amount Klim is set by expression (4) based on the inter-valley angle θv, the backlash angle θg, and the control range θc. Details of the target angel setting process are similar to those according to the above-described embodiment.

$$K\text{lim}=\theta v+\theta g-(1/2)\times\theta c \qquad (4)$$

As shown in FIG. 11, when the shift range is switched from the P range to the not-P range at the left-aligned start, the target limit value θlim is set such that the detent roller 26 is on a frontmost side within the control range θc. In the case of the right-aligned start, the target limit value θlim is set such that the detent roller 26 is on a backmost side within the control range θc. As a result, regardless of where the motor shaft 105 is within the backlash at the start of driving, the detent roller 26 can be prevented from colliding with the second wall portion 227.

In addition, according to the present embodiment, even in the case of the right-aligned start, the detent roller 26 is not rotated further toward the back side than {θg−(1/2)×θc} from the center of the valley portion 222. In the example according to the present embodiment, $\{\theta g-(1/2)\times\theta c\}$ is 2°. Therefore, the valley-wall angle $\theta vw$ is merely required to be equal to or greater than $\{\theta g-(1/2)\times\theta c\}$. In addition, the draw-in range $\theta d$ is merely required to equal to or greater than $\pm\{\theta g-(1/2)\times\theta c\}$ from the bottommost portion of the valley portion 222. As a result, the valley-wall angle $\theta vw$ can be reduced and the shift range switching mechanism 20 can be reduced in size.

The target limit value $\theta lim$ is set based on the control range $\theta c$ over which the detent roller 26 is stopped in the valley portions 221 and 222. As a result, even if an abnormality occurs in the output shaft signal SGN_s, the motor 10 can be accurately controlled. In addition, the valley-wall angle that is the angles between the valley portions 221 and 222 and the wall portions 226 and 226 can be reduced. Therefore, the shift range switching mechanism 20 can be reduced in size.

Other Embodiments

According to the above-described embodiments, two valley portions are formed in the detent plate. According to another embodiment, the number of valley portions that are formed in the detent plate may be three or more. For example, the valley portions in the detent plate may be four and correspond to ranges that are P (parking), R (reverse), N (neutral), and D (drive). In this case, the valley portion that corresponds to the P range is the first valley portion and the valley portion that corresponds to the D range is the second valley portion. The wall portions are formed on both sides. Therefore, during switching to the P range and during switching to the D range, because the detent roller may collide with the wall portion as a result of erroneous correction by the output shaft signal, restriction by the target limit value is performed. In addition, during switching to the R range or the N range as well, restriction by the target limit value may be similarly performed. Alternatively, because the valley portion that corresponds to the range is not adjacent to the wall portion, restriction by the target limit value may be omitted. In addition, the shift range switching mechanism, the parking lock mechanism, and the like may differ from those according to the above-described embodiments.

According to the first embodiment, the target limit value is determined based on the inter-valley angle and the backlash angle. According to the second embodiment, the target limit value is determined based on the control range, in addition to the inter-valley angle and the backlash angle. According to another embodiment, the target limit value can be arbitrarily set within a range in which the shift ranges can be switched and the detent roller does not collide with a wall portion.

According to the above-described embodiments, the number of stages of the output shaft signal is three. According to another embodiment, the number of stages of the output shaft signal may be two, or four or more. In addition, the output shaft signal is not limited to a signal that changes in a stepped manner. As long as the output shaft signal is that of which the value changes based on the rotation of the output shaft, such as that of which the value linearly changes, the output shaft signal may be of any kind. In addition, the output shaft sensor is not limited to a magnetic sensor, and that which is capable of detecting the rotation of the output shaft, such as a potentiometer, or the like may be used.

According to the above-described embodiments, the motor is an SR motor. According to the present embodiment, the motor may be any type of motor, such as a DC brushless motor. According to the above-described embodiments, a number of sets of windings of the motor is not mentioned. However, the set of windings may be a single set or a plurality of sets. According to the above-described embodiment, the motor rotation angle sensor is an encoder. According to another embodiment, the motor rotation angle sensor is not limited to be an encoder and may be of any kind, such as a resolver.

According to the above-described embodiment, the speed reducer is provided between the motor shaft and the output shaft. Details of the speed reducer are not mentioned according to the above-described embodiments. However, any kind of configuration, such as that in which a cycloid gear, a planetary gear, or a spur gear that transmits torque from a speed reduction mechanism that is substantially coaxial with the motor shaft to the driving shaft is used, or that in which a combination thereof are used, is possible. In addition, according to another embodiment, the speed reducer between the motor shaft and the output shaft may be omitted and a mechanism other than the speed reducer may be provided. The present disclosure is not limited in any way by the above-described embodiments. Various embodiments are possible without departing from the spirit of the present disclosure.

The control unit and the method thereof described in the present disclosure may be actualized by a dedicated computer that is provided so as to be configured by a processor and a memory, the processor being programmed to provide one or a plurality of functions that are realized by a computer program. Alternatively, the control unit and the method thereof described in the present disclosure may be actualized by a dedicated computer that is provided by a processor being configured by a single dedicated hardware logic circuit or more. Still alternatively, the control unit and the method thereof described in the present disclosure may be actualized by a single dedicated computer or more, the dedicated computer being configured by a combination of a processor that is programmed to provide one or a plurality of functions, a memory, and a processor that is configured by a single hardware logic circuit or more. In addition, the computer program may be stored in a non-transitory computer-readable storage medium that can be read by a computer as instructions performed by the computer.

While the present disclosure has been described with reference to embodiments, it is to be understood that the disclosure is not limited to the embodiments and constructions. The present disclosure covers various modification examples and modifications within the range of equivalency. In addition, various combinations and configurations, and further, other combinations and configurations including more, less, or only a single element thereof are also within the spirit and scope of the present disclosure.

What is claimed is:

1. A shift range control apparatus for controlling a shift range switching system that switches shift ranges by controlling driving of a motor, the shift range control apparatus comprising:

a motor angle calculating unit that acquires a motor rotation angle signal that is based on a rotation position of the motor from a motor rotation angle sensor that detects a rotation of the motor, and calculates a motor angle based on the motor rotation angle signal;

an output shaft signal acquiring unit that acquires an output shaft signal that is based on a rotation position of an output shaft from an output shaft sensor that detects the rotation position of the output shaft to which the rotation of the motor is transmitted;

a target angle setting unit that sets a target rotation angle based on a target shift range and the output shaft signal; and a driving control unit that controls driving of the motor such that the motor angle becomes the target rotation angle, wherein the target angle setting unit sets the target rotation angle to a target limit value, in response to the target rotation angle that is set based on the output shaft signal being a value at which rotation occurs that is further toward a back side in a rotation direction than the target limit value that is set based on shift ranges before and after switching.

2. The shift range control apparatus according to claim 1, wherein:

the shift range switching system includes a rotating member in which a plurality of valley portions is formed and that integrally rotates with the output shaft, an engaging member that engages with the valley portion based on the shift range, and an urging member that urges the engaging member in a direction in which the engaging member fits together with the valley portion, play exists between a motor shaft that is a rotation shaft of the motor and the output shaft, and when an angle corresponding to a total amount of play is a backlash angle, the target limit value is set based on an angle between the valley portion corresponding to the shift range before switching and the valley portion corresponding to the target shift range, and the backlash angle.

3. The shift range control apparatus according to claim 2, wherein:

the target limit value is set based on a control range in which the engaging member is stopped by the valley portion.

4. The shift range control apparatus according to claim 2, wherein:

the valley portion includes a first valley portion that corresponds to a parking range that is provided on one end side, and a second valley portion that corresponds to a range other than the parking range that is provided on another end side;

a first wall portion that is provided on one end side in the first valley portion and a second wall portion that is provided on the other end side in the second valley portion are formed in the rotating member;

an angle between the first valley portion and the first wall portion, and an angle between the second valley portion and the second wall portion are greater than the backlash angle; and the target limit value is set to a position at which the engaging member is further toward a front side than the first wall portion or the second wall portion and within a draw-in range in which the engaging member can be fitted into the valley portion based on the target shift range by the urging force of the urging member.

5. The shift range control apparatus according to claim 3, wherein:

the valley portion includes a first valley portion that corresponds to a parking range that is provided on one end side, and a second valley portion that corresponds to a range other than the parking range that is provided on another end side;

a first wall portion that is provided on one end side in the first valley portion and a second wall portion that is provided on the other end side in the second valley portion are formed in the rotating member;

an angle between the first valley portion and the first wall portion, and an angle between the second valley portion and the second wall portion are greater than the backlash angle; and the target limit value is set to a position at which the engaging member is further toward a front side than the first wall portion or the second wall portion and within a draw-in range in which the engaging member can be fitted into the valley portion based on the target shift range by the urging force of the urging member.

6. A shift range control system for controlling a shift range switching system that switches shift ranges by controlling driving of a motor, the shift range control system comprising:

a processor;

a non-transitory computer-readable storage medium; and a set of computer-executable instructions stored on the non-transitory computer-readable storage medium that, when read and executed by the processor, cause the processor to implement:

acquiring a motor rotation angle signal that is based on a rotation position of the motor from a motor rotation angle sensor that detects a rotation of the motor, and calculates a motor angle based on the motor rotation angle signal;

acquiring an output shaft signal that is based on a rotation position of an output shaft from an output shaft sensor that detects the rotation position of the output shaft to which the rotation of the motor is transmitted;

setting a target rotation angle based on a target shift range and the output shaft signal;

controlling driving of the motor such that the motor angle becomes the target rotation angle; and setting the target rotation angle to a target limit value, in response to the target rotation angle that is set based on the output shaft signal being a value at which rotation occurs that is further toward a back side in a rotation direction than the target limit value that is set based on shift ranges before and after switching.

7. A shift range control method for controlling a shift range switching system that switches shift ranges by controlling driving of a motor, the shift range control method comprising:

acquiring a motor rotation angle signal that is based on a rotation position of the motor from a motor rotation angle sensor that detects a rotation of the motor, and calculates a motor angle based on the motor rotation angle signal;

acquiring an output shaft signal that is based on a rotation position of an output shaft from an output shaft sensor that detects the rotation position of the output shaft to which the rotation of the motor is transmitted;

setting a target rotation angle based on a target shift range and the output shaft signal;

controlling driving of the motor such that the motor angle becomes the target rotation angle; and setting the target rotation angle to a target limit value, in response to the target rotation angle that is set based on the output shaft signal being a value at which rotation occurs that is further toward a back side in a rotation direction than the target limit value that is set based on shift ranges before and after switching.

* * * * *